March 19, 1963  F. L. CALHOUN ETAL  3,081,666
INSPECTION DEVICE
Filed April 22, 1959  2 Sheets-Sheet 1
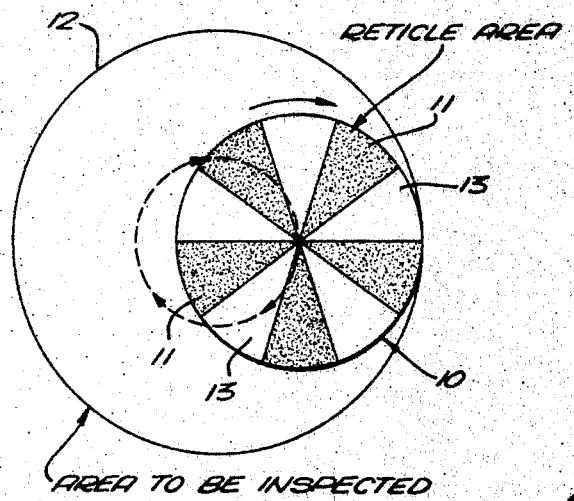
FIG. 1.
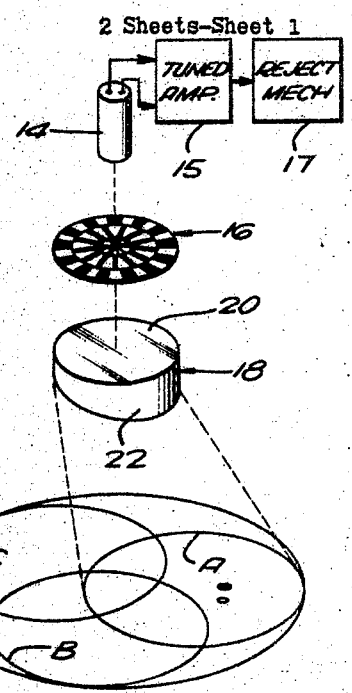
FIG. 2.
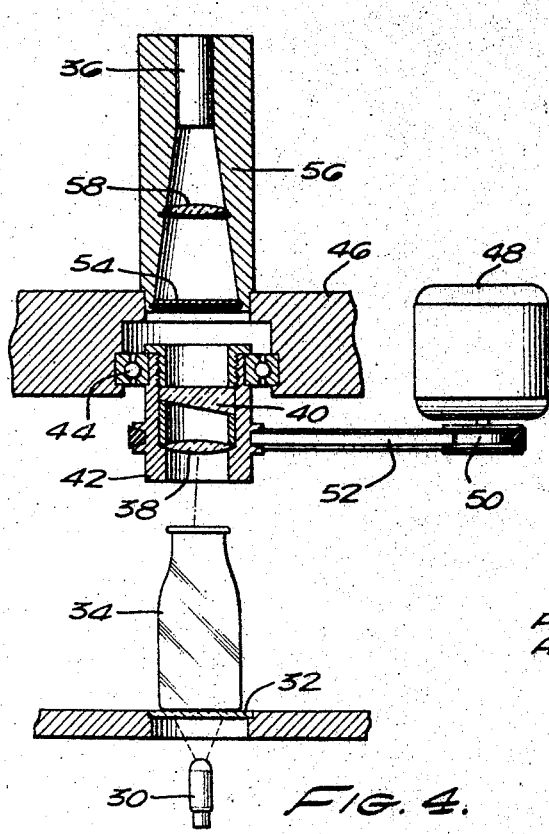
FIG. 3.
FIG. 4.
FREDRICK L. CALHOUN,
ABNER L. BROWNING,
INVENTORS.
BY Lyon & Lyon
ATTORNEYS March 19, 1963  F. L. CALHOUN ETAL  3,081,666
INSPECTION DEVICE Filed April 22, 1959  2 Sheets-Sheet 2

FREDRICK L. CALHOUN,
ABNER L. BROWNING,
INVENTORS.

BY Lyon+Lyon
ATTORNEYS

United States Patent Office 3,081,666
Patented Mar. 19, 1963

3,081,666
INSPECTION DEVICE
Frederick L. Calhoun and Abner L. Browning, Inglewood, Calif., assignors, by mesne assignments, to Geo. J. Meyer Manufacturing Co., Cudahy, Wis., a corporation of Wisconsin
Filed Apr. 22, 1959, Ser. No. 808,172
21 Claims. (Cl. 88—14)

This invention relates to apparatus for inspecting bottles for cleanliness and, more particularly, to improvements therein.

In an application for a Bottle Inspection System, Serial No. 741,634, filed June 12, 1958 and now abandoned, and assigned to a common assignee, there is described a novel bottle inspection system of the type wherein at one side a light source, preferably diffused, is provided, and at the other side, a photoelectric scanning arrangement is positioned. Bottles or other translucent containers, which it is desired to inspect, are passed through the inspection zone defined by the light source and the photoelectric scanning arrangement. When a foreign object is present in the bottle, this is detected at the output of the photocell and the bottle-reject operation is initiated.

In accordance with the invention described in the above-mentioned application, the photoelectric scanning means has combined therewith a reticle consisting of a disc having alternate opaque and transparent areas. This reticle is rotated in front of the photoelectric scanning means to intercept the light which is passing through the bottle to the photoelectric scanning means. If the illumination of the bottle is such as to provide what may be called a "field of light," then the entire field emanating from the bottle is simultaneously applied to the rotating disc or reticle. The reticle is made up of substantially radially extending alternate opaque and translucent areas. This enables the detection of smaller foreign particles than could be detected heretofore. For any foreign particle in the bottle, the opaque areas of the rotating reticle are alternately over the particle covering it and then uncovering it. By covering and uncovering is meant that an opaque area is interposed or not between the particle and photocell. Thereby, the output of the photocell is an alternating-current signal having a frequency basically determined by the speed of rotation of the reticle times the number of spokes. For a clean bottle, the output of the reticle is substantially direct current.

The system described briefly above and in the aforesaid application operates successfully to detect smaller foreign particles than heretofore. However, there are several limitations on the detection capability of such a scanning system. For example, the sensitivity of the scanner at the center of the rotating reticle is very low, particularly to large, symmetrical objects that overlap the center. Furthermore, foreign matter that forms a line through the center of the reticle and several other positions off center provide very poor response.

An object of the present invention is to provide an improved scanning system which eliminates low-sensitivity scanning regions.

Another object of the present invention is the provision of a novel scanning system which provides a high response sensitivity, regardless of the position of the dirt in the light field or its shape.

Yet another object of the present invention is the provision of a novel and improved scanning system which provides a high sensitivity over the entire zone being scanned, regardless of dirt-particle size or shape.

These and other objects of the invention are achieved in an arrangement where a spoked reticle is positioned in front of the photoelectric scanner to intercept the light from the light field. However, instead of simultaneously scanning the entire light field, which emanates from a bottle in the inspection zone, means are provided for applying light to the reticle from less than the entire area of the light field. Further provision is made for moving this means to cover successive areas of the light field so that the reticle will thereby scan the entire light field.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

FIGURE 1 illustrates the type of scan employed by the embodiment of the invention;

FIGURE 2 shows one arrangement in accordance with this invention for projecting the light from successive areas of the light field upon a reticle;

FIGURE 3 shows another arrangement for projecting successive areas of a light field upon a reticle;

FIGURE 4 shows one embodiment of the invention;

Figure 5:
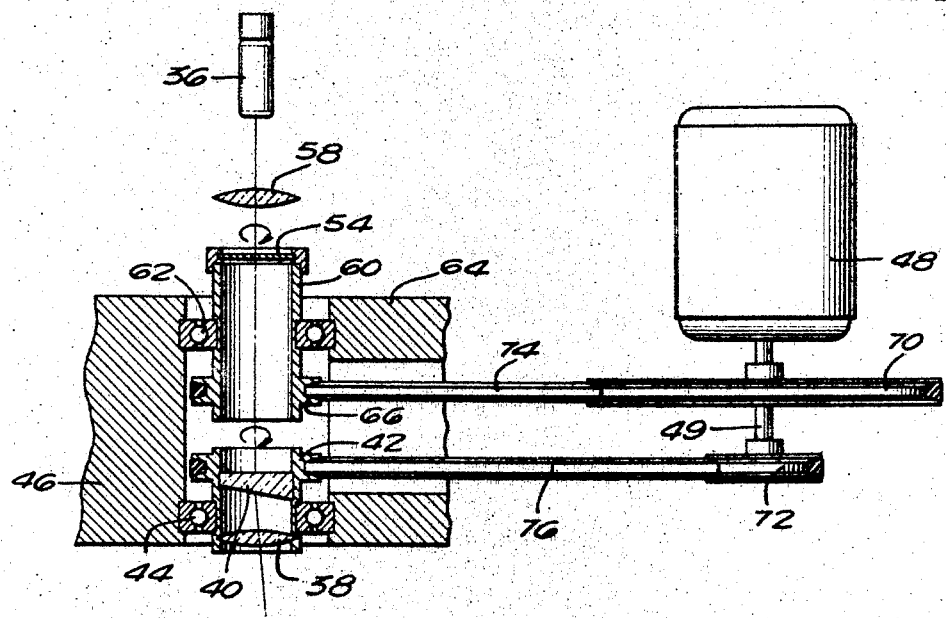
FIGURE 5 shows a preferred embodiment of the invention.

Referring now to FIGURE 1, there may be seen a reticle or disc 10 having alternate opaque 11 and translucent 13 areas thereon. In the invention described in the application referred to previously, the reticle was rotated on its axis, for example, in the direction indicated by the arrow. By means of a suitable lens system (not shown) the entire field of light, represented by the circle 12, emanating from the bottle which is being inspected would be focused upon the reticle. Thus, any dirt particle which is either at the center or which overlaps the center substantially equally provides substantially no indication to the inspection apparatus. The reason for this is that, in the absence of a dirt particle, the light passing through the reticle to a photocell remains constant, even though the reticle is rotating, and therefore the photocell ouput is substantially direct current.

Should a dirt particle be present at locations other than those of the type mentioned, then, at one instant, the dirt particle is covered by one of the opaque areas and the light coming through the reticle to the photocell has one value, and at the next instant the reticle is moved so that the dirt particle comes under one of the translucent areas, whereby the amount of light is varied from what it was previously. Thus, an alternating-current signal will be seen from the output of the photocell. Obviously, a particlue in the region of the center of the reticle causes extremely minor changes in the alternating current signal being derived from the photocell, and thus the system is not particularly sensitive to particles falling in the region mentioned.

In accordance with this invention, if instead of focusing the entire area of the field of light emanating from a bottle on the reticle, a means were provided for preventing all but the light from a portion of the area of the light field from falling upon the reticle, and then successive areas are moved past the reticle so that it inspects the entire light-field area, then the low, or insensitive, regions previously discussed are eliminated. This is schematically illustrated in FIGURE 1, where the large circle 12 represents the entire light field area which is to be inspected. The size of the disc 10 is shown to be much smaller than this area for the purpose of illustrating that only a portion of the light-field area is seen by the disc at any one time. This need not necessarily be the case, since by means of lenses the lightfield area and the disc may have any relative size. The optics selected may provide the condition desired as shown in FIGURE 1. For the condition shown, the diameter of the reticle is slightly larger than the radius of the area to be inspected. The reticle and light field are then moved in a relative path, whereby the reticle is nutated and in one revolution the entire area to be inspected is scanned. The nutating path of the center of the reticle relative to the light field is represented by the dashed circle in FIGURE 1. As indicated, the reticle diameter is slightly larger than the radius of the area to be inspected, so as to have an overlap in the center to insure adequate coverage. The reticle need not be rotated as the nutating motion occurs, but it is preferred that it does and at a higher speed than the speed of nutation. In this manner, it is insured that any point in the field is scanned at some time by the more sensitive parts of the reticle. Furthermore, by the rotation of the reticle, any point in the field is scanned more than once, and thus positive detection is obtained.

The area scanned or total light field 12 which is inspected, as pointed out above, is determined by rotating the smaller instantaneous field defined by the disc or reticle 10 along the dashed line circle, shown in FIGURE 1, at some nutating rate $S_2$. The reticle is also spun at preferably a higher rate $S_1$. Now if both the reticle and the nutation motion are clockwise, as shown in FIGURE 1, then the frequency output across the field is not a constant. On the nutation circle the frequency is essentially the reticle frequency $S_1$. On the edge of the field 12 the frequency is $S_1+NS_2$. Toward the center of the field 12, the frequency is $S_1-NS_2$. The N is the number of dark spokes in the reticle. For example, the reticle frequency is 2000 cycles per second, the nutation speed is 20 cycles per second, and the reticle has five light and five dark spokes; then, on the nutation circle, the output frequency is 2000 cycles, and on the edge of the field 12 the frequency is approximately 2000+(5×20), or 2100 cycles. The frequency output at the center of the field is approximately 2000−(5×20), or 1900 cycles. At positions between the center and the edge of the field, the frequencies range from 1900 to 2100 cycles per cycle. It should now become apparent that the sensitivity of the field can be shaped so as to enhance the signal output of any radial belt in the field by adjusting the frequency response of the detection apparatus, such as that of an amplifier following a pickup phototube (shown in FIGURE 2). Thus, if such an amplifier is tuned from 1900 to 2100 cycles, the entire field is covered, but other circuit noises are rejected. This allows an optimum signal-to-noise ratio for the system.

Although it is possible to nutate the reticle while the light field remains stationary, a much simpler arrangement for obtaining the desired result is shown in FIGURE 2. There, the photocell 14 has interposed between it and light emanating from a bottle to be inspected a reticle 16. The phototube has its electrical output connected to a tuned amplifier 15. The amplifier 15 output is applied to the reject mechanism 17, which operates in the presence of a predetermined output from the amplifier 15. Between the reticle and the light field from the bottle there is shown a prism 18. The prism has two opposite faces, one of which 20 is flat and the other 22 is at an angle to the flat face. The flat face is substantially parallel to the reticle. The prism at any one instant will only gather light from one of the areas delineated by the circles A, B or C, depending upon the instantaneous position of the prism. Only the light from the delineated area will be enabled to fall upon the reticle 16. Accordingly, by rotating the prism 20, it successively permits light from a different area of the light field to fall upon the reticle, whereby the reticle may scan the entire light field. The amplifier 15 is tuned to amplify either all the frequencies generated by the combined disc and prism rotations, taking the reticle markings into consideration, or only a portion of the frequencies generated, or to have a shaped frequency response, depending on the nature of the field inspection desired. Optimum signal-to-noise ratio for the system can thus be achieved for the entire field or any part of it.

FIGURE 3 shows an arrangement which may be substituted for the prism. It consists of a pipe 25, which is hollow and which has its cylindrical axis offset from the axis of rotation. The pipe is supported for rotation in a mount 24. This, in turn, is held in a bearing 26. The size of the inner diameter of the pipe should be sufficient so that the center of the light field area being scanned as the pipe rotates is overlapped. Another method, not shown, is to use a Cassegrainian type of telescope with a tilted-mirror optical system.

FIGURE 4 is a more complete arrangement in accordance with this invention for inspecting a bottle for dirt particles. The inspection zone may be defined as the zone which has at one side a means for illuminating the bottle, such as a light bulb 30 and an opal glass 32. The light from the bulb passes through the glass, which diffuses it, and thereafter the light passes through the bottle 34. The other side of the inspection zone is the photocell scanning means 36.

Opposite the bottle is a field lens 38, which focuses the light field upon the reticle 54. The prism 40 is the same type of prism as the one 18, shown and described above in reference to FIGURE 2. The prism 40 and field lens 38 are both mounted in a bearing pulley 42. The bearing pulley is mounted in a bearing 44, which in turn is mounted in a bearing block 46. A motor 48 drives a motor pulley 50, which in turn drives a belt 52. This belt passes over the bearing pulley 42, and thus the prism mounted therein is enabled to be rotated. The reticle 54 is mounted at one end of a light pipe 56, in the other end of which the photocell 36 is supported. A condensing lens 58 focuses the output of the reticle upon the photocell 36. Both bearing block and light pipe insure that no extraneous light will reach the photocell. In the embodiment of the invention shown in FIGURE 4, the reticle is maintained stationary and the prism 40 is rotated rapidly to insure several scans of the entire light-field area while the bottle 34 is in the inspection zone.

FIGURE 5 shows a preferred arrangement of the embodiment of the invention. The light bulb 30 illuminates the inspection zone. The light from the bulb 30 passes through the opal glass 32, and then through the bottle 34. The field lens 38 focuses the light from the light field upon the reticle 54. The prism operates in the manner described to transmit the light from a portion of the entire area of the light field to the reticle 54.

The field lens and prism are mounted in a bearing pulley 42. The bearing pulley is mounted in a bearing 44, which in turn is mounted in a bearing block 46. The reticle 54 is supported in a light pipe 60. The light pipe, in turn, is rotatably mounted in a bearing 62, which in turn is supported from a bearing block 64. A pulley 66 at one end of the light pipe 60 is used to enable the rotation of the light pipe and reticle. A condensing lens 58 focuses the light from the reticle 54 upon the photocell 36.

The motor 48 has a shaft 49, upon which there are two pulleys, respectively 70, 72. The pulley 72 is much smaller than pulley 70. A belt 74 passes over the pulley 70 and around the pulley 66 for the purpose of rotating the reticle 54. A belt 76 passes over the pulley 72 and the pulley 42, for the purpose of rotating the prism. In view of the sizes of the pulleys, the reticle will be rotated at a speed which is higher than the speed of rotation of the prism. As the prism assembly rotates, the projected field is also rotated at the same speed, thus giving the desired nutation effect. It should be noted that although the nutation illustrated herein is circular in form, this should not be considered as a restriction, since with different lenses and/or mirrors which can be employed, other types of field scanning may be employed.

The pattern of alternate translucent and opaque areas on the reticle should be optimized, in order to eliminate any null positions in the field. This can be accomplished if the reticle is designed so that the object in the field always crosses several of the radial spokes, regardless of the object's position in the field. The spot provided by the object must pass over opaque and clear areas in order to obtain the light variations necessary. The resulting frequency of the output variation should be as constant as possible.

Figure 6:
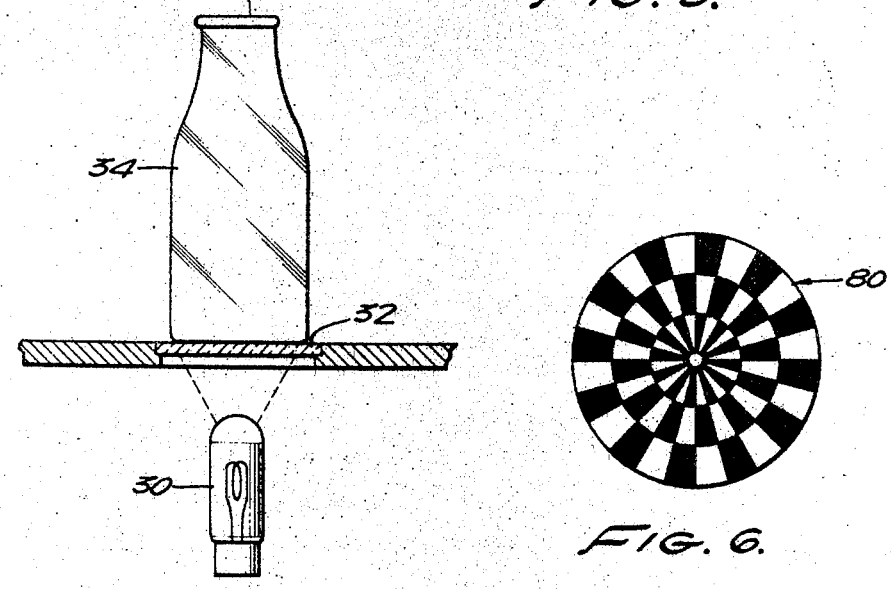
FIGURE 6 shows a preferred arrangement for a reticle.

Reference is now made to FIGURE 6, which illustrates one type of optimized pattern arrangement. The reticle 80 has the alternate light and dark areas disposed in concentric rings and the radially extending light and dark areas are also alternated.

There has been accordingly shown and described herein a novel, useful arrangement for increasing the accuracy of an inspection system and for also eliminating any positions within the field of inspection which because of their location relative to the reticle being employed caused the apparatus to be insensitive. This invention enables the detection of any contrast in an otherwise homogenous field being inspected.

We claim:

1. In a system for inspecting a bottle for foreign particles, means disposed relative to the bottle for directing energy toward the bottle, means responsive to the energy from the bottle for modulating the energy from the bottle to obtain the passage from the modulating means of energy having direct characteristics upon the lack of occurrence of a foreign particle in the bottle and having characteristics alternating at a particular frequency in accordance with the occurrence of foreign particles in the bottle and in accordance with the characteristics of the scan, means disposed relative to the modulating means for obtaining a scan by the modulating means of the energy from progressive areas of the bottle at successive instants of time where each progressive area extends from the periphery of the bottle past the center of the bottle and includes the center of the bottle and a progressive distance along the periphery of the bottle, means responsive to the energy passing from the modulating means at successive instants of time for producing signals in accordance with such energy and having alternating characteristics and representative of any foreign particles in the bottle, and means responsive to the alternating signals from the last-mentioned means for passing only the signals approximately the particular frequency to provide an output indication of a foreign particle in the bottle.

2. In a system for inspecting a bottle for foreign particles, means disposed relative to the bottle for directing energy toward the bottle, means disposed relative to the bottle for passing the energy from progressive areas of the bottle on a cyclic basis where the progressive areas in the cycle on a composite basis constitute the complete area of the bottle and where the progressive areas overlap to obtain a complete scan of the bottle, and where each of the progressive areas extends from the periphery of the bottle past the center of the bottle, means disposed relative to the last-mentioned means for modulating the energy passing from the last-mentioned means to obtain the production of a substantially constant energy upon the lack of occurrence of a foreign particle in the bottle and to obtain the production of alternations at a particular frequency in such energy in accordance with the occurrence of a foreign particle in the body, and means responsive only to the alternations at the particular frequency in the energy from the last-mentioned means for providing an output indication representing the occurrence of a foreign particle in the body.

3. In a system for inspecting a bottle for particles of foreign matter, means disposed relative to the bottle for directing energy toward the bottle, means disposed relative to the bottle for sequentially scanning progressive areas of the bottle to pass the energy from such progressive areas at successive instants of time where the energy is substantially constant at the successive instants of time upon the lack of occurrence of a foreign particle in the bottle and where the energy has alternating characteristics upon the occurrence of a foreign particle in the bottle, and means responsive to the alternating energy passing from the scanning means upon the occurrence of a foreign particle in the bottle for producing signals having characteristics representing the position of a particle in the bottle.

4. In a system for inspecting a bottle for particles of foreign matter, means disposed relative to the bottle for directing energy toward the bottle, means disposed relative to the bottle for sequentially modulating the energy from the bottle to obtain the passage from the modulating means of energy having substantially constant characteristics upon the lack of occurrence of a foreign particle in the bottle and having characteristics alternating at a frequency related to the operation of the modulating means and dependent upon the occurrence of a particle in the bottle and dependent upon the position of the particle in the bottle, and means responsive to the alternating energy passing from the modulating means for producing electrical signals having a frequency related to the frequency in the alternations in the energy from the modulating means to provide an indication as to the position of the foreign particle in the bottle.

5. In a system for inspecting a container for particles of foreign matter, a source disposed relative to the container for directing energy toward the container, nutating means disposed relative to the container for passing energy from the container at progressive areas of the container and at successive instants of time where each progressive area has a length greater than one-half of the length of the container to provide an overlap in the progressive areas, and means response to the signals from the signal means for providing a direct signal representing a lack of occurrence of a foreign particle in the container and for providing an alternating signal representing the occurrence for a foreign particle in the container.

6. In an inspection system for detecting foreign particles in a container, means disposed relative to the container for illuminating the container to provide a field for inspection, means disposed relative to the container for scanning the entire field and including a continuously rotating optical member for sequentially scanning different areas which together comprise the field, each of the extended areas scanned at any instant being substantially larger than the size of the foreign particles to be detected and having a length greater than one-half of the length of the field, and means disposed relative to the scanning means and responsive to the light from said optical member for converting such light to a direct signal in response to a lack of occurrence of a foreign particle in the container and for converting such light to an alternating signal in response to the presence of a particle in the container.

7. In a system for inspecting a bottle for dirt and including means for illuminating the bottle, the improvement including: a disc having alternate opaque and translucent areas, means operatively coupled to the disc for supporting said disc in a position to intercept light passing from said bottle, means for directing upon said disc the light from an area of said bottle which is smaller than the entire area of said bottle and which extends beyond the center of said bottle from the periphery of the bottle, photocell means disposed relative to the disc for producing signals in accordance with the light passing through the disc, circuit means operatively coupled to the photocell means for producing a substantially constant signal in the absence of dirt in the bottle and for producing an alternating signal upon the occurrence of dirt in the bottle, and means for moving said means for directing to sequentially direct light from progressive areas of the bottle upon said disc until said entire bottle has been scanned by said disc whereby light from the center of the bottle is provided along a circular path across said disc.

8. In a system as recited in claim 7 wherein said means for directing light from less than the entire area of said bottle upon said disc comprises a cylindrical prism having two faces, one face being substantially parallel to said disc and the other face being at an angle to said one face.

9. In a system as recited in claim 7 wherein said means for directing light from less than the entire area of said bottle upon said disc comprises a hollow cylinder, and means for supporting said hollow cylinder between said disc and bottle for rotation with its axis at an angle to the axis of rotation.

10. In a system as recited in claim 7 wherein said disc has alternate opaque and translucent areas disposed in concentric rings and alternating radially as well as within said concentric rings.

11. In a system as recited in claim 7 wherein said means for supporting said disc includes means for rotating said disc through a plurality of revolutions within the time of directing the light from the entire bottle upon said disc by said means for directing.

12. In a system for inspecting a bottle for dirt and including means for illuminating the bottle, the improvement including: a light chopper having alternate translucent and opaque areas, means operatively coupled to the light chopper for supporting said light chopper in a position to intercept the light passing from said bottle, means for directing upon said light chopper light from a particular portion of said bottle including a prism positioned between said bottle and said light chopper and having one face parallel to said light chopper and a second face at an angle to said one face, and means operatively coupled to said prism for rotating said prism to sequentially direct light from progressive portions of said bottle upon said light chopper until said entire bottle has been scanned by said light chopper, photocell means disposed relative to the light chopper to produce signals in accordance with the light passing through the chopper, and circuit means operatively coupled to the photocell means for producing a direct signal in the absence of dirt in the bottle and for producing an alternating signal upon the occurrence of dirt in the bottle to provide an indication as to the presence of dirt in the bottle.

13. In a system for inspecting a bottle for dirt as recited in claim 12 wherein said means for supporting said light chopper includes means for rotating said light chopper on the same axis of rotation as that of said prism and at a different relative speed.

14. In a system for inspecting a bottle for dirt and defined by means for illuminating the bottle, the improvement comprising a light chopper having alternate translucent and opaque areas, means for supporting said light chopper in a position to intercept the light passing from said bottle, means for directing the light from less than the entire area of said bottle upon said light chopper including a prism positioned between said bottle and said light chopper and having one face parallel to said light chopper and an opposite face at an angle to said one face, means operatively coupled to the prism for rotatably supporting said prism for rotation about the same axis of rotation as that of said light chopper, and means operatively coupled to said light chopper and said prism for rotating said light chopper and said prism and for rotating said light chopper at a different speed than said prism, photoelectric means disposed relative to the light chopper for inspecting the light passing through said chopper, and means operatively coupled to the photoelectric means for producing a direct signal in the absence of dirt in the bottle and for producing an alternating signal upon the occurrence of dirt in the bottle.

15. In a system as recited in claim 14 wherein said light chopper is a disc having its alternate opaque and translucent areas disposed in concentric rings and alternating radially as well as within said concentric rings.

16. In a system for inspecting a bottle for dirt and including means for illuminating the bottle, the improvement including: a photocell, a light chopper having alternate translucent and opaque areas and disposed between the bottle and the photocell, means operatively coupled to the light chopper for rotatably supporting said light chopper in a position to intercept light passing from said bottle to said photocell, means including a prism disposed between the bottle and the light chopper for directing the light from less than the entire area of said bottle upon said light chopper, means operatively coupled to said prism for rotatably supporting said prism to obtain a rotation of the prism about the same axis of rotation as that of said light chopper, means operatively coupled to the light chopper and the prism for rotating said light chopper and said prism and for rotating the light chopper at a speed different from that of said prism, and an amplifier connected to receive said photocell output, said amplifier including means for tuning the amplifier to reject direct signals representing the absence of dirt in the bottle and respond to particular frequencies in the output of said photocell for providing an indication as to the presence of dirt in the bottle and as to the position of the dirt in the bottle.

17. A bottle inspection system for indicating the presence of a foreign particle in a bottle, comprising, means for illuminating a bottle with light, scanning means constructed and disposed relative to the bottle to pass light of substantially constant intensity upon the lack of occurrence of a foreign particle in the bottle and to pass light of varying intensity upon the occurrence of a foreign particle in the bottle, said scanning means including a member having alternate opaque and translucent areas and a cylindrical prism rotatably mounted between said bottle and said member, means for rotating said prism to successively direct light from different areas of the bottle upon said member until the entire light field has been scanned by said member, photoelectric means constructed and disposed relative to said scanning means to receive light from said scanning means and to render a substantially constant signal output when receiving light of constant intensity and to render a varying signal output when receiving light of varying intensity, and an inspection circuit means responsive to the output from said photoelectric means and constructed to pass a bottle when a substantially constant signal is received and to reject a bottle when a varying signal is received from said photoelectric means.

18. In an inspection system for detecting foreign particles in a container, means disposed relative to the container for illuminating the container for inspection, means disposed relative to the container and the illuminating means for sequentially directing light from different areas of the illuminated container as a beam along a particular path, where each of the different instantaneous areas extends beyond the center of the container and where the different areas together cover the entire container, and means including photocell means positioned in the particular path of the beam of directed light for converting light from only predetermined portions of the beam to electrical signals and for generating a direct signal in response to a lack of occurrence of a foreign particle in the container and for generating an alternating signal in response to the presence of a foreign particle in the container.

19. In an inspection system for detecting foreign particles in a container, means disposed relative to the container for illuminating the container for inspection, means disposed relative to the container for cyclically and sequentially scanning the light passing from progressive extended areas of the container where the extended area of the container at any instant extends from the periphery of the container to a position beyond the center of the container and is substantially greater than the size of the foreign particles to be detected, and means responsive to the light scanned by the scanning means for converting the light from the different extended areas of the container to a direct signal upon the lack of occurrence of a foreign particle in the container and to an alternating electric signal upon the presence of a foreign particle in the container.

20. In a system for inspecting a bottle for particles of dirt, including means disposed relative to the bottle for illuminating the bottle to provide a light field for inspection, photoelectric means disposed relative to the bottle for converting the light from the bottle to electrical signals having characteristics dependent upon the light directed to the photoelectric means, a stationary disc positioned in front of said photoelectric means for intercepting light directed to said photoelectric means, said disc having alternate transparent and opaque areas supported in front of the photocell means so that only particular portions of the light directed to said disc impinges upon said photoelectric means, means for directing to said disc light from an extended area of the light field which is substantially larger than any particles of dirt in the bottle and smaller than the entire area of the field and which extends beyond the center of the bottle, and means for moving said directing means to sequentially direct light from successive extended areas of said light field until the scanning of the entire light field by said stationary disc to obtain the production of a direct signal by the photoelectric means upon the lack of occurrence of a foreign particle in the bottle and to obtain the production of an alternating signal by the photoelectric means upon the occurrence of a foreign particle in the bottle.

21. In an inspection system for detecting foreign particles in a container, first means for illuminating the container for inspection, second means disposed relative to the container for directing light from said container as a beam along a particular path where said beam includes the center of the container and progressive portions of the periphery of the container, and third means including photocell means positioned in the particular path of the beam of directed light for converting light from the beam to electrical signals and for generating a direct signal in response to the absence of a foreign particle in the container and for generating an alternating signal in response to the presence of a foreign particle in the transparent container, said second means including a rotatable prism positioned between said container and said photocell means and constructed to produce a movement of said beam with respect to said photocell means in accordance with the rotary movements of the prism and further including means operatively coupled to the prism for obtaining a rotary movement of the prism.

References Cited in the file of this patent

UNITED STATES PATENTS

| 1,647,631 | Ives | Nov. 1, 1927 |
| 2,016,036 | Fitz Gerald | Oct. 1, 1935 |
| 2,265,037 | Gulliksen | Dec. 2, 1941 |
| 2,431,510 | Salinger | Nov. 25, 1947 |
| 2,946,893 | Baum | July 26, 1960 |

FOREIGN PATENTS

| 635,499 | Great Britain | Apr. 12, 1950 |